| United States Patent [19] | [11] Patent Number: 4,551,245 |
|---|---|
| Ramsden et al. | [45] Date of Patent: Nov. 5, 1985 |

[54] ACYLATED POLYETHYLENIMINE BOUND CHROMATOGRAPHIC PACKING

[75] Inventors: Hugh E. Ramsden, Scotch Plains, N.J.; Michael Henry, Easton, Pa.

[73] Assignee: J. T. Baker Chemical Co., Phillipsburg, N.J.

[21] Appl. No.: 725,807

[22] Filed: Apr. 22, 1985

[51] Int. Cl.$^4$ ............................................... C02F 1/68
[52] U.S. Cl. ............................. 210/198.2; 210/502.1; 502/401
[58] Field of Search ............................. 210/198.2, 502; 502/401

[56] References Cited

U.S. PATENT DOCUMENTS

| | | | |
|---|---|---|---|
| 3,722,181 | 3/1973 | Kirkland et al. | 210/656 |
| 3,892,678 | 7/1975 | Halasz | 502/401 |
| 4,212,905 | 7/1980 | Tsibris | 210/656 |
| 4,245,005 | 1/1981 | Regnier | 55/67 |
| 4,290,892 | 9/1981 | Abbott | 210/656 |
| 4,431,544 | 2/1984 | Atkinson et al. | 210/656 |

*Primary Examiner*—Morton Foelak
*Attorney, Agent, or Firm*—George W. Rauchfuss, Jr.

[57] ABSTRACT

The acylated reaction product of silica gel or controlled pore glass and polyethyleniminopropyl trimethoxy silane suitable for use as chromatographic column packing, wherein said acyl function does not have a terminal carboxyl.

13 Claims, No Drawings

ACYLATED POLYETHYLENIMINE BOUND CHROMATOGRAPHIC PACKING

BRIEF DESCRIPTION OF INVENTION

In accordance with the present invention, the covalently bound, non-crosslinked polyethylenimine reaction product of particulate silica gel having an average particle diameter of from about 3 to about 70 microns and an average pore size of from about 50 to about 1000 Angstrom units, or particulate controlled pore glass (CPG) having an average particle diameter of from about 37 to 177 microns and an average pore size of from about 40 to about 1000 Angstrom units, with polyethylenimino-propyl trimethoxy silane (PEI-Pr-triMeO-silane) having an average molecular weight of from about 400 to about 1800 is N-acylated with an acid halide or acid anhydride wherein the acyl function does not have a terminal carboxyl. The resultant acylated PEI-PrSi-silica gel and PEI-PrSi-CPG products, respectively, are useful as solid phases suitable for column packing in liquid chromatography for the purification and separation of proteins.

PRIOR ART

Alpert and Regnier in J. Chromatogr. 185, 375–392 (1979) have shown that polyethylene imine (PEI) may be adsorbed to silica surfaces, thereby providing sufficient primary and secondary imino groups on adjacent adsorbed PEI molecules to be crosslinked by multifunctional oxiranes into a polymeric layer. Recently, the separation of synthetic oligonucleotides using high-performance liquid chromatography (HPLC) with columns of microparticulate silica coated with crosslinked polyethylene imine has been reported in the literature by T. G. Lawson et al., Anal. Biochem. 133, 85–93 (1983). In contrast, the present invention provides a porous silica or glass support to which a non-crosslinked polyethyleneiminopropyl silane is covalently bonded, rather than being adsorbed thereon, the imino and amino functions of which are acylated with a terminally non-carboxylated acyl moiety.

DETAILED DESCRIPTION OF THE INVENTION

The present invention provides an acylated modification of the non-crosslinked covalently bound PEI-PrSi-silica gel and PEI-PrSi-CPG products described by Hugh Ramsden, one of the co-inventors hereof, in his copending U.S. patent application Ser. No. 555,368, filed Nov. 25, 1983, and entitled "Polyethylenimine Bound Chromatographic Packing; and also in his copending South African patent application No. 84/8886, filed Nov. 14, 1984, identically titled and claiming priority of said U.S. application; the content of said applications being incorporated herein by reference. Ramsden's PEI-PrSi-silica gel products are also described in U.S. Pat. No. 4,469,630.

Since Ramsden's non-crosslinked covalently bound PEI-PrSi-silica gel and PEI-PrSi-CPG products constitute the substrates to be acylated in accordance with this invention, the following relevant excerpt from Ramsden's above-identified applications is reproduced herewith:

Excerpt from Ramsden's U.S. Pat. Appln. No. 555,368

"The non-crosslinked covalently bound PEI silica gel and glass products of the present invention are conveniently prepared in accordance with the following steps:

A. reacting either particulate silica gel having an average particle diameter of from about 3 to about 70 microns and an average pore size of from about 50 to about 1000 Angstrom units, or particulate controlled pore glass having an average particle diameter of from about 37 to 177 microns and an average pore size of from about 40 to about 1000 Angstroms, in an inert organic solvent slurry with a lower alkanolic solution of polyethyleniminopropyl trimethoxy silane having an average molecular weight of from about 400 to about 1800, said reaction being conducted at ambient to refluxing temperature for about 2 to about 50 hours;

B. recovering the resultant solid fraction from the reaction mixture; and

C. heating said solid fraction at a temperature and for a time sufficient to dry and completely bond the silane to the respective silica gel or controlled pore glass.

As used herein, the term "covalently bound" or "covalently bonded" means that the PEI moieties are covalently attached to the silica gel or controlled pore glass by way of chemical interaction resulting in a propylsilyl (Pr-Si) linkage; and the term "noncrosslinked" means that the imino and amino groups on adjacent covalently bound PEI moieties are not crosslinked, or reacted with a crosslinking agent, to form a polymeric layer.

Without being bound thereby, it is believed that the reaction proceeds to completion in two steps as follows:

Step 1: Silica hydroxyls and the methoxy groups on the silane react to form Si-O-Si bonds and free methanol, with some residual methoxy groups remaining unreacted:

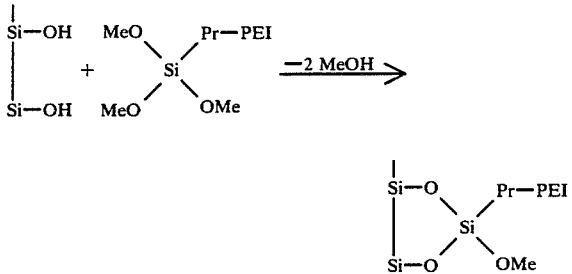

Step 2: Completion of the reaction with the residual methoxy groups is effected during heat curing by (a) and (b):

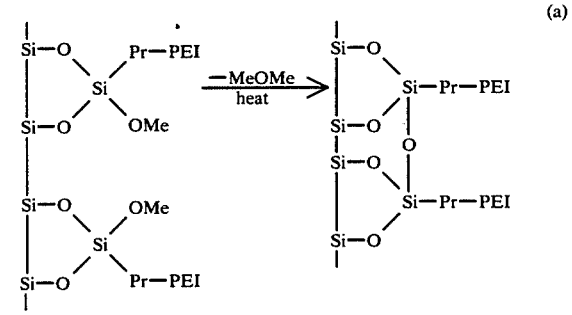

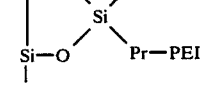

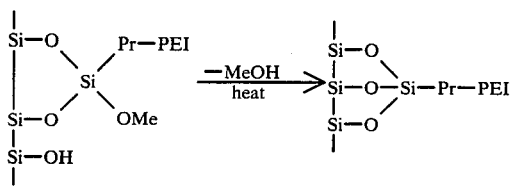

Silica gel, consisting of amorphous silica, is commercially available in irregular and spherical (preferred) particulate forms and in several commercial grades with mesh sizes ranging from 3 through 325 (ASTM). Rather than relying upon a numerical indication of mesh size, however, more accurate indicia for purposes of this invention are the average diameter and average pore size of the silica gel particles, respectively, from about 3 to about 70 microns and from about 50 to about 1000, preferably 250–500, Angstrom units. For end product use in packing HPLC chromatographic columns, a silica gel starting material of from about 3 to about 10 microns is preferred, and, for packing low pressure chromatographic columns, from about 40 to about 70 microns is preferred.

Controlled pore glass (CPG), which is a silicate containing support material chemically similar to silica for use in liquid chromatography, is commercially available, for example, from the Pierce Chemical Co., Rockford, Ill., with average particle diameter of 37–177 microns and average pore size of 40–1000 Angstroms, preferably 40–500 Angstrons.

Among the inert organic solvents suitable for preparing the silica gel or CPG slurry are aliphatic hydrocarbons such as, for example, hexane, heptane and the like; aromatic hydrocarbons such as, for example, benzene, toluene, xylene and the like; lower alkanols such as, for example, ethanol, isopropanol, butanol and the like; chlorinated methanes such as, for example, methylene chloride, chloroform, carbon tetrachloride and the like (Caution: such chloro solvents may react at higher temperatures!); and such other inert solvents as tetrahydrofuran, glyme, diglyme and the like. In general a 1:5 ratio of silica gel or CPG in grams to solvent in milliliters affords a suitable slurry. Due to the fine, insoluble nature of the particulate silica gel and CPG, a slurry rather than a true solution is obtained.

Polyethyleneiminopropyl trimethoxy silane, also known as (N-trimethoxysilylpropyl)-polyethylenimine, is the reaction product of polyethylenimine and aminopropyltrimethoxy silane can be represented by the following formula:

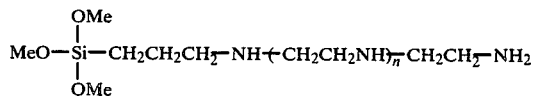

(I)

wherein, for purposes of this invention, n is an integer from about 4 to about 37, or, if expressed in terms of average molecular weight, from about 400 to about 1800.

The silane (I) is used in the reaction with the silica gel or CPG in the form of a lower $C_1$–$C_6$ alkanolic solution using sufficient alkanol to solubilize the silane. A fifty percent w/w isopropanolic solution is preferred. In general, about 25–100 grams of the silane, or, alternatively, about 50–200 ml of a fifty percent w/w alkanolic solution of the silane, is used to react with each 100 grams silica gel or CPG. The reaction may be conducted at ambient temperature although elevated temperatures up to the refluxing temperature of the reaction solvent system may be utilized to enhance the rate of reaction. The reaction proceeds readily to substantial completion (Step 1) within 2–50 hours. Stirring during admixture of the reactants is advantageously employed although the reaction thereafter may continue without further stirring. Anhydrous conditions are not critical, it having been found that the presence of a small amount of water, for example, about 0.1–1.0 ml per 50 ml of the slurry solvent, does not adversely affect the reaction.

The resultant solid fraction is recovered from the reaction mixture by conventional physical means, for example, filtration, centrifugation, etc. In general, a filtering means sufficient to retain a particle size of 5 microns is suitable whereas centrifuging is suitable for a particle size of 3 microns.

The recovered solid fraction is then heat cured at a temperature and for a time sufficient to dry and completely bond the silane to the silica gel or CPG covalently. In general, from about 1–4 hours at about 40°–120° C. has been found sufficient. The thus-obtained covalently bound, non-crosslinked final product preferably contains from about 0.5 to about 3.8 percent nitrogen."

End of Excerpt

It has now been found that the imino and amino functions of the aforementioned non-crosslinked covalently bound PEI-PrSi-silica gel and PEI-PrSi-CPG products of Ramsden may be N-acylated with an appropriate acid halide or acid anhydride as the acylating agent to provide an acyl function having the formula: R—CO—, wherein R is a member selected from the group consisting of $C_{1-8}$ alkyl; phenyl; aralkyl; and phenyl substituted with one or more substituents selected from the group consisting of $C_{1-4}$ alkyl, $C_{1-4}$ alkoxy, halo and nitro. The term "halo" includes bromo, chloro, fluoro and iodo. The term "aralkyl" includes benzyl, 1-phenethyl, 2-phenethyl, α-naphthyl and the like.

The percent nitrogen in the PEI-Pr-Si silica gel or PEI-PrSi-CPG substrate, which is readily determinable by conventional elemental analysis, is indicative of the relative combined total of imino and amino functions on the PEI moiety. Sufficient acylating agent is used to react with substantially all of the imino and amino functions on the PEI moiety. In general, the N-acylation step is readily accomplished with an equivalent amount or slight excess of the acylating agent in an inert aprotic organic solvent. Typical acylating agents include acetyl chloride, acetic anhydride, propionyl chloride, propionic anhydride, butyryl chloride, hexanoyl chloride, octanoyl chloride, benzoyl chloride, p-nitrobenzoyl chloride, 3,5-dinitrobenzoyl chloride, o-, m- and p-methoxybenzoyl chloride, o-, m- and p-chlorobenzoyl chloride, 2,4,6-trichlorobenzoyl chloride, o-, m- and p-methylbenzoyl chloride, phenylacetyl chloride and the like. Typical aprotic solvents include an aromatic hydrocarbon such as, for example, benzene, toluene, xylene and the like; an ether such as tetrahydrofuran, dioxane and the like, and an aliphatic hydrocarbon such as hexane, heptane and the like. An equivalent amount or slight excess of an acid scavenger such as, for example, a tertiary amine, preferably a tertiary alkyl amine, is advantageously employed to pick up the acid released during the acylation reaction.

Accordingly, this invention provides a noncrosslinked polyethyleneimine (PEI) function covalently bound to silica gel or controlled pore glass by way of a propylsilyl (Pr-Si) linkage wherein substantially all, i.e., more than 80% and, preferably, more than 95% of the imino and amino functions of the PEI moiety are acylated with an acyl function having the formula: R—CO—, as previously defined.

More specifically, the present invention provides an N-acylated covalently bound, non-crosslinked polyethylenimine reaction product of particulate silica gel having an average particle diameter of from about 3 to about 70 microns and an average pore size of from about 50 to about 1000 Angstrom units, or particulate controlled pore glass having an average particle diameter of from about 37 to about 177 microns and an average pore size of from about 40 to about 1000 Angstrom units, with polyethyleniminopropyl trimethoxy silane having an average molecular weight of from about 400 to about 1800, wherein the N-acyl moiety has the formula: R—CO—, in which R is a member selected from the group consisting of $C_{1-8}$ alkyl, phenyl, aralkyl and phenyl substituted with one or more substituents selected from the group consisting of $C_{1-4}$ alkyl, $C_{1-4}$ alkoxy, halo and nitro.

The subject N-acylated PEI-PrSi-silica gel or PEI-PrSi-CPG products constitute new and useful bonded phases for the purification and separation of proteins by column chromatography and are particularly suitable with modern HPLC instrumentation. The packing may be of various mesh sizes, for example, from about 50 to about 600 mesh.

The preferred N-acylated PEI-PrSi-silica gel products are those obtained from the reaction product of particulate silica gel having an average particle diameter of from about 5 to about 40 microns and an average pore size of from about 50 to about 330 Angstrom units and polyethyleniminopropyl trimethoxy silane having an average molecular weight of from about 400 to about 600; and those obtained from particulate silica gel having an average particle diameter of from about 40 to about 62 microns and an average pore size of from about 250 to about 500 Angstrom units and polyethyleniminopropyl trimethoxy silane having an average molecular weight of about 1000.

It is believed that the subject N-acylated PEI-PrSi-silica gel and PEI-PrSi-CPG products separate proteins on the basis of weak hydrophobic interactions. The marked advantages in separating proteins with the subject products are deemed surprising and unusual since presently available chromatographic matrixes that separate on this basis generally give broad peaks with poor selectivity and non-quantitative recovery of proteins. In contrast, the chromatographic matrixes of this invention provide sharp well-defined peaks with good selectivity and quantitative recovery of both protein mass and, in the case of enzyme separation, without significant loss of enzyme activity.

The present invention is even more surprising since one would normally expect the herein described chromatographic matrixes to be hydrolytically unstable in aqueous high ionic strength mobile phases used for hydrophobic interaction chromatography due to the inherent solubility characteristics of silica in such high ionic strength aqueous solutions. Thus, one would normally expect that the use of silica based matrixes would necessarily result in short column lifetimes. The opposite, however, is true with the subject N-acylated PEI-PrSi-silica gel and PEI-PrSi-CPG products. As illustrated in Example 17, HPLC columns packed with the subject chromatographic matrixes, are useable over 1000 hours with mobile buffer phases with very little change in column performance quality.

According to this invention, therefore, there are provided chromatographic columns suitable for liquid chromatography packed with (as the solid phase) the N-acylated covalently bound, non-crosslinked polyethylenimine reaction product of particulate silica gel having an average particle diameter of from about 3 to about 70 microns and an average pore size of from about 50 to about 1000 Angstrom units, or particulate controlled pore glass having an average particle diameter of from about 37 to about 177 microns and an average pore size of from about 40 to about 1000 Angstrom units, with polyethyleniminopropyl trimethoxy silane having an average molecular weight of from about 400 to about 1800, wherein the N-acyl moiety has the formula: R—CO— as previously described.

The following examples are presented to illustrate, but not to limit, the subject invention.

EXAMPLE 1

A. To a slurry of 10 grams silica gel with average particle diameter of 40 microns and average pore size of 60 Angstroms, commercially available from J. T. Baker Chemical Co., Phillipsburg, N.J. in irregular form as "Silica Gel #7024", in 50 ml toluene is added with stirring 19.71 grams of a 50% w/w isopropanolic solution of polyethyleniminopropyl trimethoxy silane having an average molecular weight of 400–600 (assume 500), commercially available from Petrarch Systems Inc., Bristol, PA, as "(N-Trimethoxysilylpropyl)-Polyethyleneimine PS076". The mixture is stirred at room temperature (about 25° C.) for about 1 hr. 10 min. and then allowed to stand overnight (about 17 hours) without stirring. Stirring is again initiated for another 5 hr. 40 min. at room temperature and again the mixture is allowed to stand overnight. The mixture is next filtered over a medium fritted glass filter. The filtrate is washed with 50 ml toluene twice and with 50 ml methanol twice to ensure removal of any excess silane reactant and then oven dried at 80°–85° C. for about 3 hr. 30 min. to yield about 12 grams of the covalently bound PEI-silica gel product; about 3.9% N.

B. The procedure of Example I-A is repeated except that 1 ml water is added to the silica gel/silane mixture. The yield of the PEI bonded silica gel product is about 13.3 grams; about 5.5% N.

EXAMPLE 2

A slurry of 20 grams silica gel with average particle diameter of 5.25 microns and average pore size of 330 Angstroms, commercially available from The Sep A Ra Tions Group, Hesperia, CA, as a spherical silica under the trademark "Vydac A", Catalog No. 101TPB5, in 100 ml toluene and 2 ml water is prepared and stirred for 10 minutes at room temperature. To this is added with stirring 39.4 grams of a 50% w/w isopropanolic solution of polyethyleniminopropyl trimethoxy silane having an average molecular weight of 500 and the mixture is stirred for an additional 5 minutes. The mixture is then allowed to stand overnight at room temperature. The mixture is next filtered using a 1.0 micron filter funnel. The filtrate is washed with 50 ml toluene twice and 50 ml methanol twice, then air dried on the funnel and finally oven dried at 80°–85° C. for about 3 hr. 30 min. to yield the PEI bonded silica gel product; about 2.85% N.

EXAMPLE 3

A slurry of 20 grams of 230–400 mesh (ASTM) silica gel having an average particle diameter of 40–63 microns and an average pore size of 420 Angstroms, commercially available from E. Merck Reagents, Germany, under the brand name "Fractosil 500", in 50 ml methanol and 1 ml water is prepared and stirred for 5 minutes at room temperature. A separate solution of 11.2 grams of a 50% w/w isopropanolic solution of polyethyleniminopropyl trimethoxy silane having an average molecular weight of 1800 in 100 ml methanol is also prepared. The silane solution is then added to the silica gel slurry over 5 minutes with stirring. After addition is complete, stirring is discontinued and the mixture is allowed to stand at room temperature for 50 hours. The mixture is next filtered over medium sized sintered glass. The filtrate is washed with $3 \times 50$ ml methanol under vacuum and then oven dried at 80°–85° C. for about 4 hours to yield the PEI bound silica gel product; about 1.1% N.

EXAMPLE 4

The following reaction mixtures are prepared in accordance with the teachings of the preceding examples:

| Components | A | B | C |
|---|---|---|---|
| Silica gel | 10 g | 10 g | 10 g |
| (5 microns, 330 Angstroms) | | | |
| Isopropanol | 50 ml | 50 ml | 50 ml |
| Water | 0.5 ml | 0.25 ml | 0.1 ml |
| PEIPr-triMeO—silane | 9.9 g | 4.95 g | 2 g |
| (M.W. = 600) as 50% w/w | | | |
| i-PrOH soln. | | | |

Each reaction mixture is stirred for 5 minutes at room temperature and then allowed to stand without stirring for 41 hr. 30 min. Each mixture is filtered, washed once with 50 ml isopropanol and twice with 50 ml methanol. Each filtrate is oven dried at 80°–85° C. for about 3 hr. 12 min. to yield the respective PEI bound silica gel products; A: 1.2% N, B: 1.0% N, C: 0.9% N.

EXAMPLE 5

A. To a slurry of 10 grams silica gel with average particle diameter of 40 microns and average pore size of 50 Angstroms in 50 ml hexane is added 19.71 grams of a 50% w/w i-PrOH solution of PEI-Pr-triMeO- silane having an average molecular weight of 500. The mixture is stirred for 5 minutes at room temperature and then heated to reflux temperature for about 2 hours. The mixture is allowed to cool to room temperature, filtered and washed with 50 ml hexane twice an 50 ml methanol twice. The filtrate is then oven dried at 80°–85° for about 3 hours to yield the PEI bound silica gel product.

B. The procedure of Example 5-A is repeated except that an equal amount of controlled pore glass (125 microns, 240 Angstroms) is substituted for the silica gel used therein to yield the corresponding covalently bonded, non-crosslinked PEI-PrSi-CPG product.

EXAMPLE 6

To 5 grams of the PEI-PrSi-silica gel product of Example 2 (about 5 microns; about 330 Angstroms; about 3% N) in 25 mililiters of toluene is added 2 mililiters of triethylamine followed by 0.6 mililiter of acetic anhydride. The mixture is shaken to homogeneity and let stand with occasional shaking overnight (about $17\frac{1}{2}$ hours). The N-acetylated product is filtered off, washed successively with toluene, methanol, 50/50 MeOH/HOH, water, and 3 times with methanol. It is then oven dried at 80°–85° C. to dryness. Product yield: 5 grams. Analysis: 8.52% C; 2.01% H; 2.81% N.

EXAMPLE 7

The procedure of Example 6 is repeated except that an equivalent amount of butyryl chloride is substituted for the acetic anhydride. The product yield of the corresponding N-butanoyl product is about 5.04 grams. Analysis: 9.12% C; 2.21% H; 2.62% N.

EXAMPLE 8

The procedure of Example 2 is repeated except that 0.8 mililiter of hexanoyl chloride is substituted for the acetic anhydride. The yield of the corresponding N-hexanoyl product is about 5.05 grams. Analysis: 9.59% C; 2.26% H; 2.58% N.

EXAMPLE 9

Twenty grams of PEI-PrSi-silica gel (about 15–20 microns; about 300 Angstroms; about 1.2% N) is treated with 8 mililiters of triethylamine and 2.4 mililiters of butyryl chloride in accordance with the procedure of Example 2 except that the resulting N-butanoyl product is washed once with toluene and then once with methanol. Product yield: 19.3 grams. Analysis: 5.96% C; 1.63% H; 1.17% N.

EXAMPLE 10

The procedure of Example 2 is repeated except that an equivalent quantity of the PEI-PrSi-CPG product of Example 5B is substituted for the PEI-PrSi-silica gel product to yield the corresponding N-acetylated PEI-PrSi-CPG gel product.

EXAMPLE 11

A ten gram sample of PEI-PrSi-silica gel (about 5 microns; about 300 Angstroms; about 1.71% N) is treated with 150% excess of butyryl chloride and equivalent triethylamine (1.38 ml BuOCl; 2.54 ml Et$_3$N) in accordance with the procedure of Example 9. Yield: 10.2 grams. Analysis: 6.68% C; 1.26% H; 1.65% N.

EXAMPLE 12

Twenty grams of PEI-PrSi-silica gel (about 40 microns; about 250 Angstroms; about 3.5% N) in 20 ml toluene is treated with 10.5 grams benzoyl chloride and 7.6 grams triethylamine for about 18 hours. The resultant benzoylated PEI-PrSi-silica gel product is filtered; then washed successively with 200 ml toluene, 200 ml methanol, 200 ml water and three times with 200 ml methanol; and dried at 80°–85° C. Yield: 22.2 grams. Analysis: 16.78% C; 1.94% H; 2.87% N.

EXAMPLE 13

The procedure of Example 12 is repeated except that 11.5 grams of 3,5-dinitrobenzoyl chloride is used as the acylating agent in the presence of 7.0 grams triethylamine to yield the corresponding 3,5-dinitrobenzoylated PEI-PrSi-silica gel product. Yield: 23.6 grams. Analysis: 13.33% C; 1.62% H; 3.37% N.

EXAMPLE 14

The procedure of Example 12 is repeated except that 10.5 grams of p-anisoyl chloride is used as the acylating agent in the presence of 7.6 grams triethylamine to yield the corresponding p-anisoylated PEI-PrSi-silica gel product. Yield: 22.8 grams.

EXAMPLE 15

The procedure of Example 12 is repeated except that 13.1 grams of p-chlorobenzoyl chloride is used as the acylating agent in the presence of an equivalent amount of triethylamine to yield the corresponding p-chlorobenzoylated PEI-PrSi-silica gel product. Yield: 26.5 grams.

EXAMPLE 16

The procedure of Example 12 is repeated except that 11.6 grams of p-toluoyl chloride is used as the acylating agent in the presence of 10.6 ml (7.6 g) triethylamine to yield the corresponding p-toluoylated PEI-PrSi-silica gel product. Yield: 22.0 grams.

EXAMPLE 17

A standard analytical column (4.6 mm internal diameter×250 mm length) is slurry packed at high pressure (7500 psi) with butyrylated PEI-PrSi-silica gel (about 5 microns; about 300 Angstroms) obtained from Example 11 as the bonded phase. The slurry consists of 3.6 grams of the butyrylated PEI-PrSi-silica gel in 25 mls methanol. After pumping the slurry into the column, an additional 100 mls methanol are then pumped through the column at the same pressure. The column is attached to a high pressure liquid chromatograph and a solution of 25 millimolar $KH_2PO_4$, pH 7, is pumped through the column at 1 ml/min at 1200 psi flow rate until a steady baseline is observed at 280 nm. A solution of 2 molar $(NH_4)_2SO_4$ and 25 millimolar $KH_2PO_4$, pH 7, is then pumped at about the same flow rate through the column until a steady baseline is achieved. A solution (100 microliters) of a protein mixture dissolved in the high salt buffer A, made up of 2M $(NH_4)_2SO_4+25$ mM $KH_2PO_4$, is injected into the column and the protein components are eluted by decreasing the salt concentration to 25 mM $KH_2PO_4$ (buffer B) over 30 minutes at 1 ml/min. The mixture of proteins included 58 micrograms of cytochrome C; 377 micrograms of myoglobin; 203 micrograms of lysozyme; 580 micrograms of ovalbumin; and 232 micrograms of α-chymotrypsinogen A. Each protein elutes as a concentrated band, well separated from each other. Typical mass recoveries for the individual proteins were greater than ninety percent of the original amount, for example, 95% of cytochrome C, 94% of myoglobin and 92% of lysozyme. The column of this example does not demonstrate any significant loss in chromatographic performance even after 1000 hours of chromatographic use for protein separation.

We claim:

1. The N-acylated covalently bound, non-crosslinked polyethylenimine reaction product of particulate silica gel having an average particle diameter of from about 3 to about 70 microns and an average pore size of from about 50 to about 1000 Angstrom units, or particulate controlled pore glass having an average particle diameter of from about 37 to about 177 microns and an average pore size of from about 40 to about 1000 Angstrom units, with polyethyleniminopropyl trimethoxy silane having an average molecular weight of from about 400 to about 1800, wherein the N-acyl function has the formula: R—CO—, in which R is a member selected from the group consisting of $C_{1-8}$ alkyl, phenyl, aralkyl and phenyl substituted with one or more substituents selected from the group consisting of $C_{1-4}$ alkyl, $C_{1-4}$ alkoxy, halo and nitro.

2. The product of claim 1 wherein said N-acyl moiety is butyryl.

3. The N-acylated covalently bound, non-crosslinked polyethylenimine chromatographic column packing consisting essentially of the N-acylated reaction product of particulate silica gel having an average particle diameter of from about 3 to about 70 microns and an average pore size of from about 50 to about 1000 Angstrom units with polyethyleniminopropyl trimethoxy silane having an average molecular weight of from about 400 to about 1800, wherein the N-acyl function has the formula: R—CO—, in which R is a member selected from the group consisting of $C_{1-8}$ alkyl, phenyl, aralkyl and phenyl substituted with one or more substituents selected from the group consisting of $C_{1-4}$ alkyl, $C_{1-4}$ alkoxy, halo and nitro.

4. The column packing of claim 3 wherein said N-acyl moiety is butyryl.

5. The packing of claim 2 wherein the particulate silica gel has an average particle diameter of from about 5 to about 40 microns and an average pore size of from about 50 to about 330 Angstrom units and the polyethyleniminopropyl trimethoxy silane has an average molecular weight of from about 400 to about 600.

6. The packing of claim 2 wherein the particulate silica gel has an average particle diameter of about 40–62 microns and an average pore size of from about 210 to about 520 Angstrom units and the polyethyleniminopropyl trimethoxy silane has an average molecular weight of about 1000.

7. A method for preparing the N-acylated product of claim 1 which comprises N-acylating the covalently bound, non-crosslinked polyethylenimine reaction product of particulate silica gel having an average particle diameter of from about 3 to about 70 microns and an average pore size of from about 50 to about 1000 Angstrom units, or particulate controlled pore glass having an average particle diameter of from about 37 to about 177 microns and an average pore size of from about 40 to about 1000 Angstrom units, with polyethyleniminopropyl trimethoxy silane having an average molecular weight of from about 400 to about 1800, with an acid halide or acid anhydride as the acylating agent, the acyl function of which has the formula: R—CO—, in which R is a member selected from the group consisting of $C_{1-8}$ alkyl, phenyl, aralkyl and phenyl substituted with one or more substituents selected from the group consisting of $C_{1-4}$ alkyl, $C_{1-4}$ alkoxy, halo and nitro.

8. A chromatographic column suitable for liquid chromatography packed with the N-acylated product of claim 1.

9. A chromatographic column suitable for liquid chromatography packed with the N-acylated column packing of claim 2.

10. A chromatographic column suitable for liquid chromatography packed with the N-acylated column packing of claim 3.

11. A chromatographic column suitable for liquid chromatography packed with the N-acylated column packing of claim 4.

12. A chromatographic column suitable for liquid chromatography packed with the N-acylated column packing of claim 5.

13. A chromatographic column suitable for liquid chromatography packed with the N-acylated column packing of claim 6.

* * * * *